United States Patent [19]
Wang

[11] 3,984,324
[45] Oct. 5, 1976

[54] MULTIPLE PLATE ULTRAFILTER
[75] Inventor: Donald G. J. Wang, Waukesha, Wis.
[73] Assignee: Aqua-Chem, Inc., Milwaukee, Wis.
[22] Filed: Oct. 11, 1973
[21] Appl. No.: 405,315

[52] U.S. Cl. .............................. 210/232; 210/321 R
[51] Int. Cl.² ......................................... B01D 31/00
[58] Field of Search .................. 210/232, 236, 321; 159/DIG. 27; 204/301

[56] References Cited
UNITED STATES PATENTS

| | | | |
|---|---|---|---|
| 3,223,612 | 12/1965 | Chen et al. ...................... | 210/321 X |
| 3,398,091 | 8/1968 | Greatorex ...................... | 159/DIG. 27 |
| 3,627,137 | 12/1971 | Bier .................................. | 210/321 |
| 3,809,246 | 5/1974 | Niogret .......................... | 210/321 X |
| 3,831,763 | 8/1974 | Breysse et al. .................. | 210/433 X |

Primary Examiner—Frank A. Spear, Jr.
Attorney, Agent, or Firm—Fred Wiviott

[57] ABSTRACT

An ultra-filter comprising a stack of alternating feed fluid conducting cells and permeate fluid conducting cells separated by semipermeable membranes. The feed cells comprise two facing gaskets which are separable to permit cleaning their interface area. The membranes are on the non-interfacing surfaces of the feed cell gaskets. Isolated passages extend through the stack for introducing feed solution to the cells and for discharging permeate solution and a residual portion of the feed solution. Planar flow passages connect the isolated passages by means of cutout portions in the feed and permeate cells. The permeate cells include a solid back-up sheet and a porous element is interposed between the back-up sheet and the adjacent membrane to support the membrane against excessive distention by pressurized feed solution. The filter stack is sealed by compression between end plates. Alignment pins extend through the stack to maintain the relative position of the components during disassembly and reassembly.

20 Claims, 13 Drawing Figures

MULTIPLE PLATE ULTRAFILTER

BACKGROUND OF THE INVENTION

This invention relates to a membrane filter for separating different molecular weight materials contained in a common solution.

Ultra-filtration is a well-known process for separating high molecular weight materials from other lower molecular weight materials in a common solution. The process involves applying a pressurized solution against a semipermeable membrane through which a portion of the feed solution permeates. Generally, the semipermeable membrane has a pore size selected to allow the passage of the permeate solution containing lower molecular weight materials at high rates while retaining the high molecular weight materials in the remaining feed solution. By the use of appropriate membranes, the larger molecules are effectively concentrated in the feed solution. The process has been applied to concentrate and/or purify proteins, enzymes, etc. in solution, but the process is especially useful in the production of food, for example, to recover protein from solutions such as whey.

A requirement for applying ultra-filtration in food production is that the filter must be easily disassembled for cleaning the membranes and the surfaces between them. Heretofore, when such filter stacks were disassembled, the membranes were often scored or otherwise damaged and upon reassembly leaks would often occur because of the difficulty of restoring the membranes in the exact positions in which they were originally interfaced with the frame or gasket that separated them. Moreover, known constructions for solving this problem were unsatisfactory because they resulted in high manufacturing cost and they usually caused other problems such as membrane rupture due to excessive distension of the membranes when subjected to the relatively high pressures used in ultra-filtration.

SUMMARY OF THE INVENTION

A general object of the present invention is to provide an improved ultra-filter for selective separation of molecules from a solution.

A further object of the invention is to provide an improved ultra-filter which may easily be disassembled for cleaning and reassembled with minimal replacement of parts.

Another object of the invention is to provide a membrane type ultra-filter which will operate with a lower pressure drop between the feed solution and the permeate solution.

A still further object is to provide membrane cells in a stack wherein the membranes interface with smooth surfaces and are not subject to tensile or shear stresses by physical contact nor distension so that the chance of membrane rupture is minimized.

The new filter comprises a stack of alternate feed and permeate cells which are separated by semipermeable membranes. The stack of cells is sandwiched between end plates and compressed to effect sealing of the flow within the cells. The feed cells are adapted to receive feed water through an inlet passage and pass it by coplanar flow within the cell in contact with the adjacent membrane on its way to an outlet passage. The intervening permeate cells have a porous membrane supporting member interposed between the membrane and a back-up sheet and are adapted to receive the portion of the solution which permeates through the membranes from the feed cells. The membranes are separated by pairs of gaskets. The space between the membrane pairs constitutes a feed solution passage. The gaskets may be parted for cleaning when the filter stack is disassembled. Alignment pins are provided to maintain relative position between the cells and membranes upon disassembly and reassembly.

The word gasket is used herein for convenience to characterize planar elements of various kinds used for separating parts, supporting membranes and providing compressive sealing surfaces.

DESCRIPTION OF A PREFERRED EMBODIMENT

Figure 1:
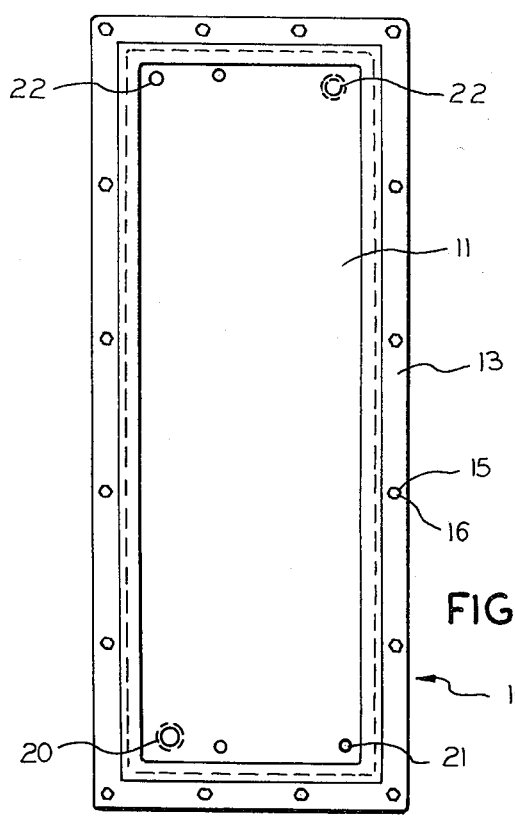
FIG. 1 is an end view of a filter assembly according to the invention.
Figure 2:
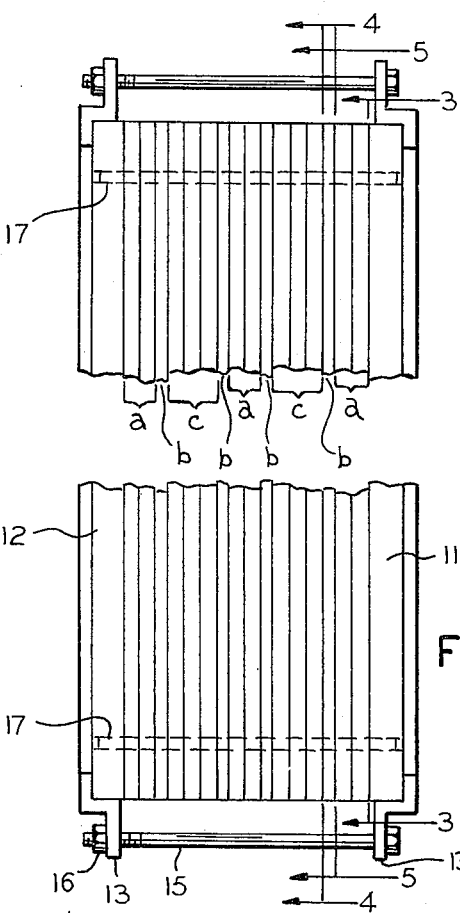
FIG. 2 is a partial side elevation of the filter assembly of FIG. 1.

Referring now to FIGS. 1 and 2, a filter assembly 10 is shown which consists of a pair of rectangular end plates 11 and 12 having a number of alternating feed cells "a", membranes "b" and permeate cells "c" intervening between them. Each of the end plates 11 and 12 has an adjacent clamping frame 13 bearing against its exposed planar surface. The clamping frames 13 compress the end plates 11 and 12 and the intervening cells by means of a plurality of interconnecting bolts 15 extending between the flange members 13 and through aligned holes in each of them. Each bolt 15 has threaded ends to receive nuts 16 which are tightened to provide the compressive force for holding the filter stack 10 together, and to seal the membrane and cell layers against leakage.

Alignment pins 17 extend through the stack of permeate and feed cells near the top and bottom of the assembly. End plate 11 has a threaded inlet opening 20 near its lower left hand corner, as viewed in FIG. 1, for connecting the piping (not shown) through which raw feed solution may be supplied under pressure by conventional means (not shown). End plate 11 also has, near its upper left and lower right hand corners, a pair of threaded openings 21 either or both of which may be coupled with pipes (not shown) to conduct the portion of the solution which permeates the membranes from the filter stack in a manner to be described later. End plate 12 is provided with similar threaded openings 21, and a threaded outlet opening 22 in plate 12 located in the upper right hand corner as viewed in FIG. 1 whihc serves as a discharged opening for the feed water from which a portion of the solution has been separated by the membranes. Opening 22 is shown by the hidden lines in FIG. 1 and may be coupled with piping (not shown) for carrying filtered feed solution from the filter 10.

Figure 9:
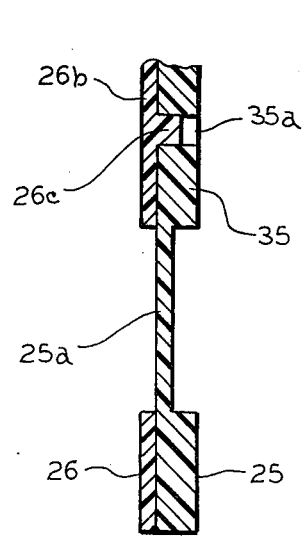
FIG. 9 is a partial section of a feed cell taken along line 9—9 of FIG. 3 showing one method of interlocking pairs of feed cell gaskets.

The construction of the feed cells a will be described with reference to FIGS. 3, 8 and 9. The feed cells comprise a pair of similar conversely superimposed rectangular gaskets 25 and 26, each of which has an S-shaped cutout 27 or planar fluid passage extending in this embodiment through a substantial portion of their interior planar surfaces. The gaskets are preferably made of a pliable plastic material such as a polyolefin or polypropylene. The S-shaped cutouts 27 being near the lower left hand corner of the gaskets 25 and 26 at 27a as viewed in FIG. 3 curving around and downwardly toward the bottom of the gasket and again reversing and continuing upwardly to a terminal point 27b near the upper right hand corner of the gaskets. Thus, the cutouts 27 may be characterized as serpentine although the planar passages so defined could have other configurations between the fluid inlets and outlets. Congruent rectangular openings 28 are formed through the gaskets 25 and 26 in the lower left hand corner at a point between the start 27a of the S-shaped cutout 27 and the lower edge of the gaskets 25 and 26 as viewed in FIG. 3. Similar congruent rectangular openings 29 are formed near the upper right hand corner of gaskets 25 and 26 between the terminal point 27b of the S-shaped cutout 27 and the top edge of the gaskets 25 and 26. A plurality of grooves or channels 30 are formed in the lower surface of the gasket 25 which faces the underlying gasket 26. Channels 30 connect openings 28 and the origin 27a of the S-shaped cutout 27. Similarly a plurality of such channels 30 are formed in gasket 25 between the terminal point 27b of the cutout 27 and rectangular opening 29. Channels 30 may be seen in cross section in FIG. 8. In an embodiment (not shown) where gaskets 25 and 26 are of equal thickness, mating half-channels are formed in each gasket. The channels 30 define a toothed cross section but since the membranes for a feed cell are not interposed between the interface of the mating gaskets 25 and 26 but are on the smooth outer faces of the gaskets, there is no opportunity for the channel to press through a membrane and fracture it. A single channel means or slot could be used instead of the plurality of channels 30 but it is desirable in any case for the channel means to restrict flow and produce some pressure drop so that sufficient pressure remains in the feed stream flowing through apertures or rectangular openings 29 to supply the adjacent feed cells properly.

Figures 3, 4, 5:
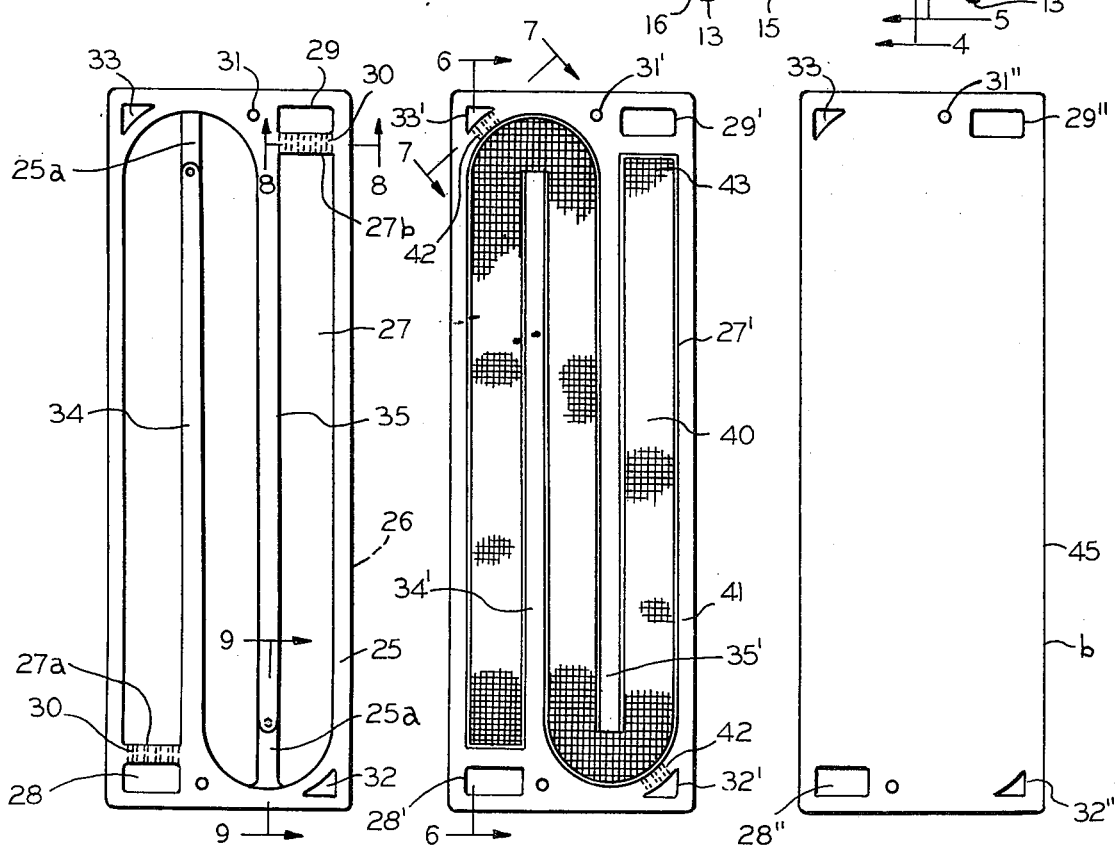
FIG. 3 is a plan view of a pair of superimposed gaskets comprising a feed cell, said view being taken along line 3—3 of FIG. 2.
FIG. 4 is a plan view of a permeate cell taken along line 4—4 of FIG. 2, said permeate cell comprising a planar back-up sheet, a gasket superimposed thereon and having a serpentine cutout defining a planar permeate solution flow path, and a reticulated or porous element in said cutout for preventing distension of an adjacent membrane.
FIG. 5 is a plan view of a membrane taken along line 5—5 of FIG. 2.

The gaskets 25 and 26 also have alignment holes 31 extending through their planar marginal surfaces near the top and bottom portion as shown in FIG. 3. Alignment pins 17, see FIG. 2, extend through holes 31 to keep the components of the filter stack in proper and reproducible alignment. In addition, triangular shaped permeate conducting holes 32 and 33 extend through the gaskets 25 and 26, which comprise a feed cell, near the lower right hand and upper left hand corners respectively. Holes 32 and 33 could have other shapes besides triangular.

Long strips 34 and 35 extend integrally and in respectively opposite directions from the internal perimeters of each gasket 25 and 26 to create the S-shaped and congruent fluid flow passages 27 which are equal in thickness to the sum of the gasket thicknesses. As seen in FIGS. 3 and 9, there is a short extension strip 25a which is of reduced thickness and connects integrally with gasket 25 and is overlapped slightly by the tip of long strip of the same gasket. As shown in FIG. 9, these extensions 25a bridge across the bends of the S-shaped cutouts but, due to their reduced thickness, they do not block the flow of feed fluid along the cutouts. The underlying thinner gasket 26 also has long strips 26b, similar to long strips 34 and 35 of the other gasket, whose tips do not extend integrally to the perimetral part of gasket 26 so as to allow further fluid flow clearance. The tips of strips 26b have button-like projections 26c which plug snugly into holes 35a in long strip 35 to hold these pieces together temporarily but so they can be detached to permit complete separation of the gaskets 25 and 26 for facilitating cleaning between them when the stack is disassembled even though there are membranes adhered to their opposite non-contacting surfaces. Of course, various means besides projections 26c and cooperating holes 35a could be used to maintain the gaskets in registry and in a detachable and positive alignment mode such as having a strip enter a recess in another strip as depicted in FIGS. 11 and 12.

Figures 11, 12:
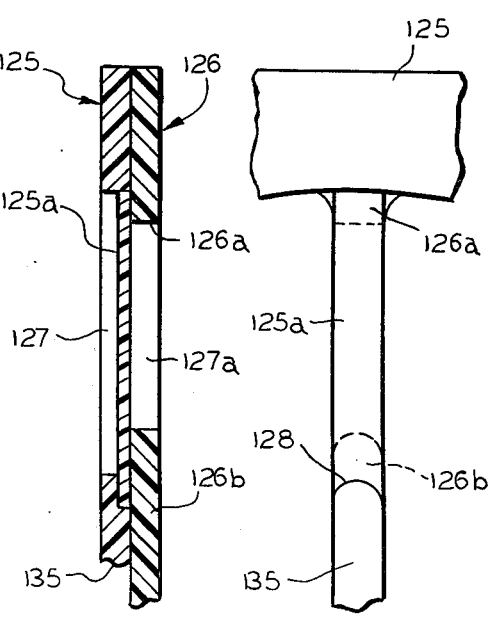
FIG. 11 is a section through an end of a pair of adjacent feed cell gaskets, similar to the section 9—9, but showing an alternative method of interlocking strips from adjacent gaskets.
FIG. 12 is a fragmentary plan view of the parts shown in FIG. 11.

FIGS. 11 and 12 show an alternative construction for registering the long strips, such as 34 and 35 of FIG. 3 on gasket 25, with substantially corresponding strips on a mating feed cell gasket 26. The FIG. 11 sectional view may be considered as being taken along 9—9 of FIG. 3 but for this alternative construction the reference numerals of the parts, insofar as they are similar are increased by one hundred. In this case gasket 125 has the same thickness as mating gasket 126 underneath it. A fragment of a long strip 135 falls short of the gasket 125 margin to create an opening 127 for passage of feed fluid lengthwise and around the S-shaped cutout. The long strip 126b of gasket 126 likewise falls short of the gasket 126 margin as shown to create a gap 127a. The inside edge of gasket 126 has an integral extension 126a which serves as a surface to which an end of thin bridging strip 125a is adhered. The other end of strip 125a is rounded concavely as indicated by 128. Strip 126b extends beyond concavity 128 underneath it to thereby provide a recess in which the rounded or convex tip of strip 135 may nest for being maintained in alignment. The overlapping strips may be adhered at their ends in which case it is still possible to separate the gaskets which comprise a feed cell sufficiently to allow cleaning between them.

As assembled feed cell a is formed by the alignment of gaskets 25 and 26 to form a rectangular planar cell having a substantially open central area defined by the S-shaped cutout 27. The cell gaskets also have aligned axial openings 28 extending through them for supplying raw fluid to each feed cell and the gaskets have diagonally opposite axial openings 29 out of which fluid that passes through the parallel S-shaped cutouts and has permeate separated from it is discharged. The triangular shaped axial permeate openings 32 and 33 also extend through the cell surface isolated from the other openings and the cutout and conduct permeate from the permeate cells. All openings through the gasket surfaces are located within the rectangular margins so that the edge of the cell is unbroken around its perimeter. In this embodiment, it will be understood that the membranes b may be adhered temporarily on the non-contacting surfaces of the superimposed pair of gaskets 25 and 26 which comprise a feed cell. Thus, when the gaskets 25 and 26 are separated for cleaning between them, one membrane will stay with each gasket. The membranes may be adhered to their gaskets in a non-permanent manner such as with pressure bonding or with adhesive so they will stay with the gaskets unless peeled off with forces as will be described later. In some designs it is also proposed to make the membranes easily separable from their supporting feed cell gasket pairs 25 and 26.

Figure 6:
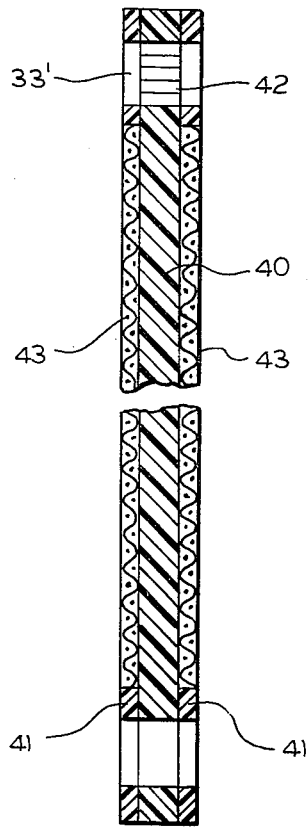
FIG. 6 is a sectional view of a permeate cell assembly taken along line 6—6 of FIG. 4.
Figures 7, 8:
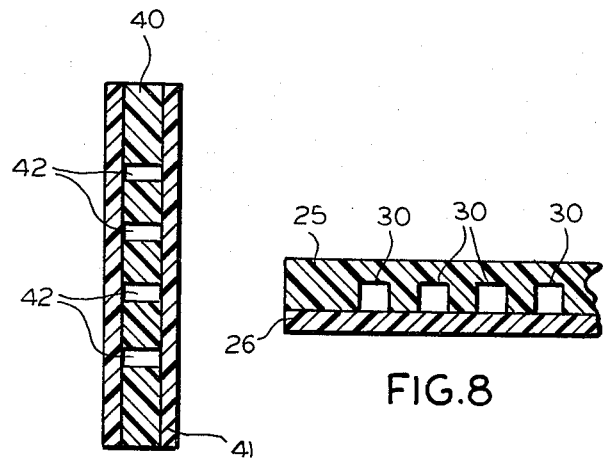
FIG. 7 is a partial sectional view of a permeate cell taken along line 7—7 of FIG. 4.
FIG. 8 is a partial sectional view of a feed cell taken along line 8—8 of FIG. 3.

Reference is now made to FIGS. 4, 6 and 7 which show details of the permeate cell construction. In a permeate cell, a rectangular back-up sheet 40 of a plastic material and having no S-shaped cutout is sandwiched between a pair of gaskets 41. Each of the premeate cell gaskets 41 has an S-shaped cutout 27' therein which corresponds in dimensions and orientation to the cutout 27 of the previously described feed cell gaskets 25 and 26. The free ends of long strips 34' and 35' of the premeate cell gaskets may be adhered to back-up sheet 40 if desired so that the gaskets and sheet may be spread apart for cleaning but not detached from each other in which case handling is made easier and there is a natural tendency for the gaskets to return to their original positions with respect to the back-up sheet. Both the gaskets 41 and the intervening back-up sheet 40 have rectangular openings 28' and 29' formed through their lower left hand and upper right hand corner regions for conducting feed fluid past the permeate cells to the feed cells. The openings 28' and 29' are substantially aligned with openings 28 and 29 of the feed cell gaskets 25 and 26 and are of similar dimensions. Alignment holes 31' similarly extend through the upper and lower portions of the gaskets 41 and back-up sheet 40 in positions to generally align with the alignment holes 31 of gaskets 25 and 26. In addition, triangular shaped permeate fluid conducting openings 32' and 33' extend through both gaskets 41 and sheet 40 in the lower right hand and upper left hand corners and are of similar shape and location as openings 32 and 33 of the feed cell gaskets 25 and 26. A plurality of permeate exit grooves or channels 42 are formed through sheet 40 and extend from the triangular openings 32' and 33' at a generally 45° angle toward the center of the sheet 40. The channels 42 in sheet 40 are of such length that their terminal points extend a short distance into the S-shaped cutout 27' in the permeate cell gaskets 41. Thus, fluid which has permeated through the membranes from the adjacent feed cells enters the S-shaped cutouts of the permeate cell gaskets 41 and from there said permeate fluid flows through channels 42 and into the aligned and sealed triangular holes 32 and 33 for being conducted away from the filter.

Disposed within the S-shaped opening 27' of each permeate cell gasket 41 is a layer of mesh 43 which corresponds substantially in shape to the S-shaped opening 27' and is of substantially the same thickness as the gaskets 41. Thus, the surfaces of the meshes and the permeate gaskets are in substantially the same plane so that the membranes are supported and not distended into the S-shaped cutouts of the backed up permeate cell gaskets by the pressure exerted on the membrane by the fluid in the adjacent feed cells. This reduces the likelihood of the membranes being distended excessivly or being so highly stressed as to tear as often occurs in prior art filters, especially where the membranes are stretched or distended over sharp edges. The mesh 43 is woven as a screen to allow edgewise flow between the individual mesh strands, is preferably non-metallic and may be made of any suitable resin. Any suitable closely reticulated or finely channeled member may be used in place of mesh 43.

A permeate cell assembly has a rectangular shape corresponding to that of the feed cells. The S-shaped cutout 27' of the permeate cell gaskets 41 communicates with the triangular shaped holes 32' and 33' through the channels 42 in plate 40 as explained. The openings 28' and 29' are isolated from the other openings and cutouts in the sheet 40 and gaskets 41. All openings through the gasket 41 and sheet 40 surfaces are located within the rectangular area so that the margin of the cell is continuous about its entire perimeter.

As seen in FIG. 5, each membrane b comprises a rectangular shaped sheet 45 which is selectively permeable to molecules and has substantially the same dimensions as gaskets 25, 26, 41 and back-up sheet 40. Rectangular openings 28'' and 29'' extend through each membrane 45 at their lower left and upper right hand corners, respectfully, and are of similar dimensions and location as holes 28, 29, 28' and 29' through the feed and permeate cell assemblies. Alignment holes 31'' for dowel or alignment pins 17 extend through the top and bottom of the membrane surface which correspond in location and dimension to alignment holes 31 and 31'. Triangular shaped openings 32'' and 33'' are also present in membrane 45 and are equal in dimension and location to openings 32, 32', 33 and 33' of the feed and permeate gasket assemblies. As explained earlier, a membrane sheet 45 of FIG. 5 is placed on opposite outside faces or above and below the superimposed feed cell gaskets 25 and 26 as in FIG. 3 and thus form a feed cell wherein the membranes confine the feed fluid to planar flow through the S-shaped cutouts.

Figure 10:
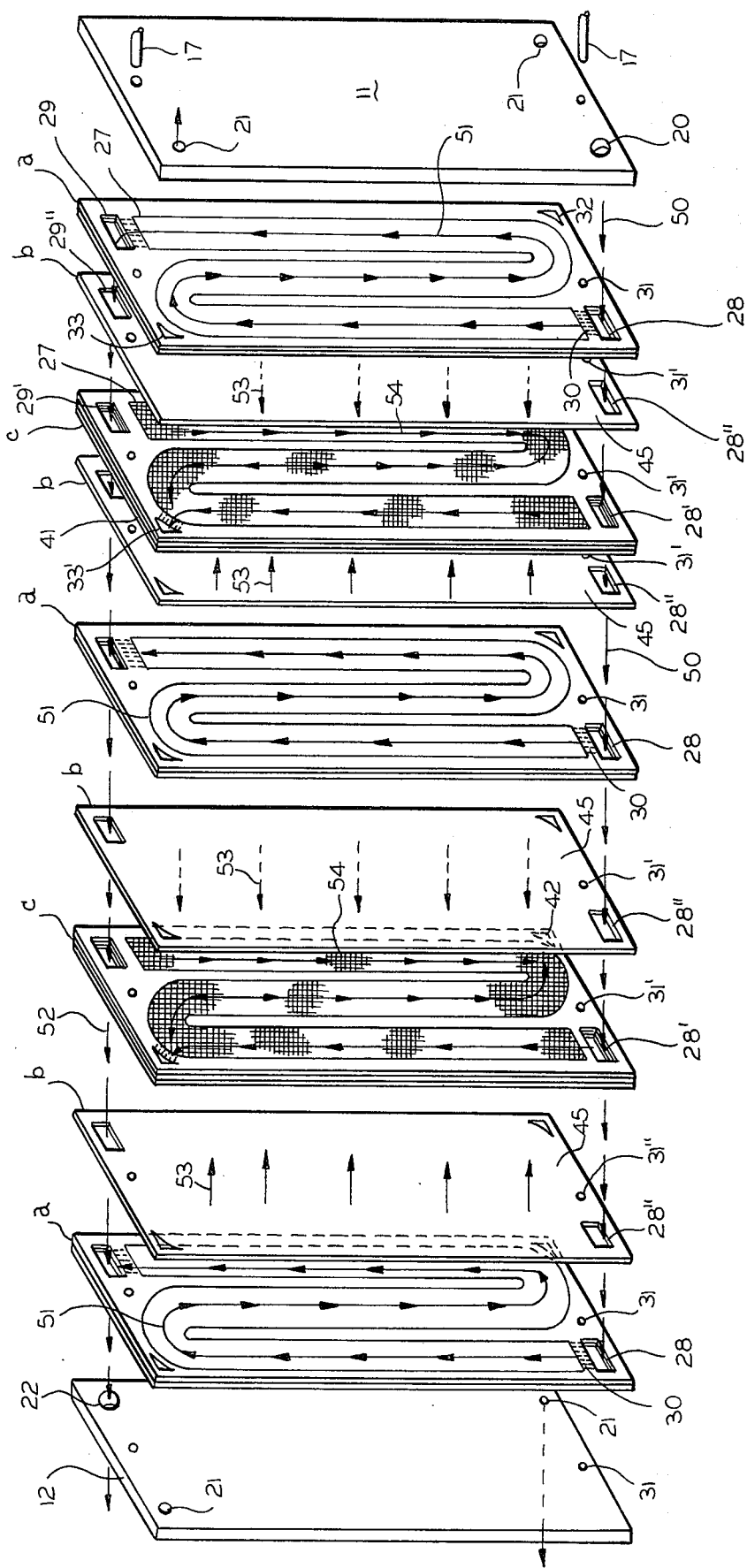
FIG. 10 is an exploded perspective view of the filter stack according to the invention with the clamping means omitted.

Having described the construction of the basic cells of the filter assembly 10, their relationship and function will now be described with reference to FIG. 10. The pressurized feed solution to the ultra-filtered, or separated into fluid fractions which respectively contain small and larger molecules, enters the filter assembly 10 through opening 20 in end plate 11 and flows as indicated by arrows 50 into the rectangular openings 28, 28', 28'' and so forth, extending normal to the stacked elements and through the feed cells a, membranes b and permeate cells c and terminating at end plate 12 where the rectangular passage 28 is blocked. The feed solution branches off in portions into each feed cell and flows upwardly through the plurality of channels 30 in the consecutive feed cell gaskets 25 into the S-shaped cutouts 27 in the feed cells and between confining membranes 45. This is indicated by the flow path arrows 51 in each of the feed cells *a*. The flow path 51 is planar through the S-shaped cutouts 27 in each of the feed cells *a* and the fluid fraction which does not permeate the membranes continues out by way of channels 30 of the S-shaped cutout 27 and into the rectangular exit passage 29, 29', 29'' and so forth extending normal to the stacked gaskets and membranes. After exiting from the S-shaped planar passages through channels 30, flow continues axially through the exhaust passageway formed by the aligned rectangular holes 29, 29' and 29'' in the feed cells, permeate cells and membranes. The flow through this feed solution exhaust passage is generally indicated by arrow 52 and continues to discharge opening 22 in end plate 12. The relatively thin feed fluid layer 51 within the S-shaped cutouts of each feed cell *a* passes in contact with the membranes *b* adjacent the feed cell. This results in a portion of the pressurized feed solution passing from the feed cells through the membranes *b* and into the adjacent permeate cells as depicted by the arrows 53. The membranes, however, only allow molecules smaller than a preselected size to pass, so that larger molecules remain in the feed cell stream and are carried therewith. The permeate solution 53 passes into the S-shaped cutouts 27' of the permeate cell gaskets 41 of the permeate cells *c*. As indicated by arrows 54, the flow within the permeate cells cascades over, under and through the mesh 43 and is ultimately discharged through channels 42 into the triangular shaped permeate discharge passages extending normally through the stacked elements and formed by the aligned openings 32, 32' and 32'', and 33, 33' and 33'', in the feed cells, permeate cells and membranes. This permeate flow proceeds through the discharge passage and out of the openings 21 formed in the face plates 11 and 12.

It will thus be appreciated that by selecting a membrane having a particular pore size, molecules in the feed solution which have molecular weights or sizes above the selected pore size are concentrated in the feed solution stream while the permeate solution is substantially free of such molecules but will contain some solvent and molecules of smaller size.

In the embodiment of the ultra-filter which has been described and shown, the feed cells are comprised of two gaskets such as 25 and 26 in FIG. 3 which have membranes 45 pressed against their outside or non-interfacing surfaces to form an enclosed cell in which there is a devious planar feed fluid flow path defined by the gasket strips such as 34 and 35 and the gasket margins. In smaller filter devices the feed cell gaskets may omit the strips 34 and 35 so that the feed fluid flow path is essentially a rectangular opening encompassed by the continuous perimetral margins of the gaskets. Screens or other reticular or grooved sheets may be deposited in this rectangular hole as well as in S-shaped cutouts 27 or passage defined by the strips 34 and 35 to subdivide the fluid, distribute it uniformly over the membrane surfaces, cause turbulence and prevent fluid channeling between the inlets and outlets of the feed cells. The sheets should preferably be no thicker than the thickness of the two gaskets.

An important feature of the construction is that the feed cells comprise at least two substantially coinciding and superimposed gaskets which can be separated for cleaning. The membranes 45 may be at least superficially or temporarily adhered to the non-interfacing marginal surfaces of the feed cell gaskets so that they stay with their associated gaskets when the latter are separated for cleaning upon disassembly of the filter, in which case cleaning of the facing surfaces of the membranes is facilitated. Since the membranes are interfaced with smooth gasket surfaces wherever they are subjected to compressive sealing forces and there is no membrane distension or deflection into any holes or channels, the membranes will undergo no high stresses that could puncture or tear them during operation of the filter or during disassembly and reassembly.

The membranes 45 may be adhered to the gaskets on a temporary basis such as with a pressure sensitive or other frangible adhesive that is compatible with the materials out of which the gaskets and membranes are made. The term temporary is used to imply that the membranes will adhere well enough to the gaskets to permit handling during cleaning but not so well as to bond and preclude detachment when a membrane must be replaced.

Figure 13:
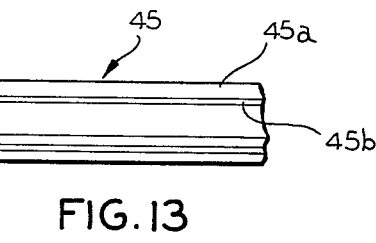
FIG. 13 is a fragmentary side view of the superimposed feed cell gasket shown in FIG. 3 on the non-interfacing surfaces of which there are membranes which are each supported by a porous web.

Temporary adhesion of the membranes to the smooth surfaces of the feed cell gaskets may be achieved by pressing the membranes against the gaskets prior to stacking the alternate feed cells and permeate cells. The temporary adhesion persists provided the proper materials are used for the gaskets and membranes. This method will be discussed in reference to FIG. 13 which shows an edge view of a feed cell comprised of gaskets 25 and 26. The membranes 45 are the composite type, that is, they comprise a porous substrate or supporting sheet 45a on which the membrane composition 45b is cast. One example is to form a polyvinyl acetal membrane 45b by spreading a solution thereof on one side of a sheet or substrate 45a comprised of porous paper or other non-woven material. While still wet, the membrane coated sides of the paper is compressed against the two non-interfacing surfaces of a feed cell gasket and temporary adhesion is achieved when pressure is relieved. Adhesion persists during assembly, disassembly and reassembly of the filter but the membranes may be peeled off without scoring the gasket surfaces so that the latter may be reused. Porous substrates coated with polyvinyl acetal membrane composition have been temporarily adhered to polypropylene gaskets by this pressure method. Polyvinyl acetals also adhere to polyolefins such as polyethylene gaskets and to methyl methacrylate. It has been found that suitable adhesion can be obtained if the chemical structure of the gasket material is close to the chemical structure of the membrane composition.

It is also contemplated that sometimes there may be a preference for causing the substrate supported membrane composites to be readily separable from the gaskets in which case the membrane structures become separate items for handling during assembly, disassembly, cleaning and repair of the filter components. In such cases adhesion of the membranes to the gaskets may be precluded by applying a suitable parting agent to the gasket surfaces before the membranes are stacked. On the other hand, the important feature of having a feed cell comprised of separable gaskets may be preserved although a membrane such as cellulose acetate is used which does not tend to adhere to most gasket materials.

Another important feature of the invention is that the gaskets 25 and 26 used for separating the membranes in a feed cell and the gaskets 41 of the permeate cells which bear on the back-up sheet 40 to provide a fluid passageway 27' all present smooth surfaces to the membranes to thereby avoid distending, overstressing or tearing the membranes. The only irregular surfaces are those in limited areas, such as the irregularities caused by the feed channels 30 and the permeate exit channels 42, see FIGS. 3 and 4, but these surfaces do not interface with the membranes. In practice, the gaskets are now made by die cutting them from a sheet of material and then milling out the channels 30. In those cases where the flow passages of the gaskets must remain unblocked but bridged as with short segments 25a engaged with the tips of long strips 34 and 35, the segments may be milled to the desired thickness or they may be inserts made from stock thinner than the gaskets and held in place by adhesive. The gaskets, nevertheless, are smooth and planar overall. The die cutting method is much less expensive than other methods of making gaskets which are smooth on at least one side and with irregularities on the other side such as the injection molding method which requires a large investment in molds and can usually only be justified when production runs are very large.

The filter stack may be easily disassembled by loosening the nuts 16 on clamp bolts 15 enabling the stacked elements to be separated for cleaning and/or replacement. Even if the membranes are deformed or recessed due to the compression of the filter stack, the alignment holes 31 and pins 17 therein assure that upon reassembly the stacked parts will reassume their exact original relationship so that there will be no interface irregularities which could cause leaks. Upon disassembly, the gaskets 25 and 26 comprising feed cells a are easily parted for complete access to the facing membrane surfaces for cleaning purposes. In addition, the two piece construction of the feed cell enables separation of gaskets 25 and 26 for better access to the plural channels 30 through which the incoming feed solution passes. This consideration, however, does not preclude the use of a one piece feed cell gasket under certain circumstances such as to minimize the manufacturing cost. The permeate cell gaskets 41 are also easily separated from the opposite faces of back-up sheet 40 for cleaning and maintenance.

It will also be appreciated that the use of solid back-up sheets 40 between the gaskets 41 of the permeate cells is substantially less expensive than the use of porous back-up plates to support the membrane surfaces. Membrane support is now provided by the mesh 43 and back-up sheets 41 which minimize membrane deflection or distension and reduce the probability of membrane rupture. The mesh 43 may also be eliminated if contiguous flow grooves (not shown) are provided in the back-up sheet surface instead, as long as smooth outer marginal sealing surfaces of the gaskets remain. Mesh may also be used in the feed cell passageways to create turbulent flow. The use of mesh not only promotes turbulence and cleansing action of the membranes but also enhances exposure to the membrane surfaces fresh feed solution which is not entirely depleted of filterable materials. This structure simplifies cleaning, disassembly and reassembly and is also less expensive to manufacture than conventional membrane filters.

In addition the structure in practice has operated with applied pressure in the range of 5–60 psi, thus proving to be a very efficient filter structure.

While one embodiment of the invention has been described, it will be appreciated by those skilled in the art that many variations are possible without departing from the spirit of the invention. The described structure has been shown to be constructed such that a parallel flow occurs through the stacked feed cells. This may be varied by appropriately blocking holes 28' or 29' in selected permeate cell assemblies, thereby causing a series flow through groups of feed cells by suitably arranging the stack. Furthermore, the described embodiment shows the use of three feed cells in a sandwich structure with two permeate cells each of which is surrounded by two membranes. The number and arrangement of cells could have numerous variations. The filter structure may also be adapted to reverse osmosis applications by suitable design variations to accommodate the increased working pressures. Accordingly, the scope of the invention is to be determined solely by interpretation of the claims which follow.

I claim:
1. A filter comprising:
a plurality of permeate cells each including substantially planar permeate gasket means having an opening formed therein and marginal surfaces enclosing said opening which constitutes a permeate conducting passageway, said marginal surfaces having at least one perforation formed therein and connected with said passageway to conduct permeate therefrom and also having perforations for conducting feed fluid and concentrate normal to the planes of said permeate cells which latter perforations are isolated from said permeate conducting passageway,
a plurality of feed cells stacked alternately between at least some of said permeate cells, said feed cells comprising substantially planar feed cell gasket means having an opening formed therein which constitutes a feed fluid conducting passageway, and marginal surfaces surrounding said passageway, said feed cell gasket means each having smooth surfaces on its opposite sides, said marginal surfaces having concentrate and feed perforations, said feed perforations communicating with said feed fluid passageway and respectively serving as inlet and outlet means therefor, said concentrate and feed perforations coinciding with said feed fluid and concentrate perforations in said permeate cell gasket means to provide fluid flow paths generally normal to said stack of planar elements, and said marginal surfaces having at least one permeate perforation formed therein and isolated from said feed fluid passageway and coinciding with said permeate perforation in said permeate cell gasket means,
a membrane in contact with each of the opposite surfaces of said feed cell gasket means and between the latter and said permeate cell gasket means whereby feed fluid flows over a pair of said membrane means simultaneously, said membranes being for conducting permeate from said feed cell passageways to said permeate cell passageways,
means for compressing said stack of permeate and feed cells in a fluid tight manner,
each of said feed cell gasket means comprises a pair of interfacing gasket members pressed toward each other so that their marginal surfaces affect a seal.
2. The filter feed cell set forth in claim 1 including:
a. flexible elements extending from at least one feed cell gasket in a pair and connecting with the other gasket, whereby to permit separation of said gaskets for access to the facing surfaces thereof.

3. The invention set forth in claim 2 wherein:

a. one of said flexible elements has a projection thereon and the other of said elements has a hole for receiving said projection, to thereby produce a selectively engageable and detachable connection between said flexible elements.

4. The filter feed cell set forth in claim 1 wherein:

a. each of said feed cell gaskets has strips extending from the marginal region thereof into said feed fluid passage to create a circuitous configuration in said passage for thereby elongating its path between said apertures, and b. means extending from at least one gasket for registering with a strip from the other gasket.

5. The filter feed cell set forth in claim 1 wherein:

a. each of said feed cell gaskets has extending therefrom into said passage a plurality of relatively long strips, the strips on one gasket overlaying the strips from the other gaskets, and b. relatively shorter strips extending from each gasket into said passage and engaging with said longer strips of an adjacent gasket, c. said long and shorter strips defining an elongated passageway and said shorter strips being at least thin enough to permit planar fluid flow along said passageway from aperture to aperture.

6. the invention set forth in claim 2 wherein:

a. one of said flexible elements has a recess thereon and another of said elements registers in said recess.

7. The filter set forth in claim 1 wherein:

the thickness of said permeate cell gasket means defining substantially the depth of said permeate fluid passageway, means disposed in said passage for preventing substantial distension of said membrane in the direction of said passageway, said means having the property of permitting flow of permeate fluid along said passageway.

8. The filter set forth in claim 1 wherein each of said feed gasket means and said permeate gasket means comprise a pair of generally planar gasket members, means for registering the planar gasket members of each pair so that said gasket members may be spread apart when said filter is disassembled to clean the membrane surfaces which is presented to the fluid passageways and so that said gasket members may be restored to their original registration when said filter is reassembled and means for pressing one end plate toward the other.

9. The filter set forth in claim 8 wherein:

a. there is a stack of alternate feed cells and permeate cells between end plate means, b. said permeate cell including a sheet means interposed between said permeate cell gasket means, said sheet means having openings aligned with the feed fluid inlet and outlet perforations in said feed cell gasket means and with said at least one permeate fluid perforations in said permeate cell gasket means, c. support means disposed respectively in said permeate fluid passageways of the permeate cell gasket means, said support means being generally planar and having a plurality of interconnected pores for permitting fluid flow therealong, d. said support means being adjacent said membranes to back up said membranes when expanded under the influence of fluid pressure in said feed cell.

10. The filter set forth in claim 9 wherein said support means comprises:

a. a sheet of porous material.

11. The filter assembly set forth in claim 10 wherein said support means comprises:

a. an open meshed screen.

12. The filter set forth in claim 1 including support means located in and substantially coplanar with said permeate passageway, said support means having a plurality of interconnected pores for permitting fluid flow therealong and supporting a membrane from the next adjacent feed cell against excessive distension due to feed fluid pressure.

13. A filter for removing entrained particles from a feed stream including a plurality of alternating feed cell means and permeate cell means, each of said feed cell means including feed gasket means having a pair of end faces and an opening formed therein and intercepting said end faces, said end faces defining a continuous perimetral marginal surface surrounding said opening to define a feed passage, said feed gasket means each comprising a pair of feed cell gaskets whose margins surround and define a feed fluid passage, said feed cell gaskets having surfaces which interface with each other and smooth non-interfacing surfaces, a plurality of generally planer, permeable membrane means each having one surface engaging a different one of the non-interfacing surfaces of said feed cell gaskets, said permeate cell means each including permeate cell gasket means and a sheet having at least one aperture for conducting permeate fluid from a surface region thereof, said permeate cell gasket means each comprising a pair of substantially planer gaskets each having one surface disposed against one surface of said sheet, said permeate gaskets each having a perimetral margin surrounding an opening defining permeate fluid passages extending along the opposite surfaces of the sheet, each of said permeate gaskets being attached to said sheet at one place at least, so that said gaskets may be parted from said sheet without detachment therefrom, the other surfaces of each of said permeate cell gaskets being disposed in engagement with the other surface of a different one of said membrane means, the opening in said feed gaskets and the openings in said permeate cell gaskets being disposed adjacent each other for passage of fluid across said membrane means from said feed gasket opening to said permeate gasket opening, said feed cells thereby being bounded by membrane surfaces on both sides for feed fluid to flow over and between said membrane surfaces simultaneously and with at least a portion of said feed fluid permeating through each of said membrane means whereby said particles become more concentrated in said feed fluid, said gaskets and said membrane means having apertures adjacent said feed gasket and said permeate gasket openings for conducting feed fluid in a direction which is generally normal to the plane of said membranes, certain of said apertures being in communication with said feed gasket openings so that feed fluid may flow between said membranes and additional ones of said apertures being connected to said permeate gasket openings for conducting permeate therefrom.

14. The filter set forth in claim 13 including support means located in and substantially coplanar with said permeate passage, said support means having a plurality of interconnected pores for permitting fluid flow therealong and supporting a membrane from the next adjacent feed cell against excess distension due to feed fluid pressure.

15. A filter comprising:
   a. a plurality of permeate cells each including separable, interfacing, substantially planar permeate gasket means having an opening formed therein and marginal surfaces enclosing said opening which constitutes a generally planar permeate conducting passageway, said marginal surfaces having at least one perforation formed therein and connected with said passgeway to conduct permeate therefrom and also having perforations for conducting feed fluid and concentrate normal to the planes of said permeate cells which latter perforations are isolated from said permeate conducting passageway,
   b. a plurality of feed cells stacked alternately between at least some of said permeate cells, said feed cells comprising substantially planar, separable feed cell gasket means in face-to-face contact with each other and each having an opening formed therein which constitutes a generally planar feed fluid conducting passageway, and marginal surfaces surrounding said passageway, said feed cell gasket means each having smooth surfaces opposite their face-to-face contacting surfaces, said marginal surfaces having perforations communicating with said feed fluid passageway and respectively serving as inlet and outlet means therefor, said last named perforations coinciding with said feed fluid and concentrate perforations in said permeate cell gasket means to provide fluid flow paths generally normal to said stack of planar elements, and said marginal surfaces having at least one permeate perforation formed therein and isolated from said feed fluid passageway and coinciding with said permeate perforation in said permeate cell gasket means,
   c. a membrane in contact with each of the opposite non-facing smooth surfaces of said feed cell gasket means and between the latter and said permeate cell gasket means whereby feed fluid flows over a pair of said membranes simultaneously, said membranes being for conducting permeate from said feed cell passageways to said permeate cell passageways,
   d. means for compressing said stack of permeate and feed cells in a fluid tight manner.

16. The filter set forth in claim 15 wherein:
   a. said gasket means which comprise a feed cell have strip means extending from inside of their margins into said feed fluid passageway to define an elongated indirect passageway between said inlet and outlet perforations, at least certain strip means of one gasket overlapping certain strip means of the other gasket, and strip means supporting said membranes when said gasket means are separated for cleaning facing surfaces of said membranes.

17. The filter set forth in claim 15 including:
   a. a sheet means interposed between said gasket means which comprise a permeate cell, said sheet means having feed fluid inlet and outlet perforations and at least one permeate perforation aligned with corresponding perforations in the gasket means of adjacent cells,
   b. said passageways of said permeate cell gasket means each being closed on one side by said sheet means and presenting their remotely opposite open sides to the next adjacent membrane surface.

18. The invention set forth in claim 17 wherein said support means comprises open meshed screen.

19. The invention set forth in claim 15 wherein:
   a. said gasket means which comprise a permeate cell having strip means extending from inside of their margins into said permeate passageway to define an elongated passageway for accepting fluid through said membrane,
   b. said strip means being attached at places to said sheet mens whereby to permit spreading of said gasket means and sheet means to enable cleaning between said gasket and sheet means when said filter stack is disassembled.

20. The filter set forth in claim 15 including support means located in and substantially coplanar with each said permeate passageway, said support means having a plurality of interconnected pores for permitting fluid flow therealong and supporting a membrane from the next adjacent feed cell against excessive distension due to feed fluid pressure.

\* \* \* \* \*